(12) United States Patent
Yoon et al.

(10) Patent No.: US 7,683,583 B2
(45) Date of Patent: Mar. 23, 2010

(54) COOLING SYSTEM OF BATTERY PACK

(75) Inventors: Junill Yoon, Seoul (KR); Jaesung Ahn, Busan (KR); Heekook Yang, Daejeon (KR); John E. Namgoong, Daejeon (KR)

(73) Assignee: LG Chem, Ltd. (KR)

( * ) Notice: Subject to any disclaimer, the term of this patent is extended or adjusted under 35 U.S.C. 154(b) by 233 days.

(21) Appl. No.: 11/549,725

(22) Filed: Oct. 16, 2006

(65) Prior Publication Data

US 2007/0194757 A1 Aug. 23, 2007

(30) Foreign Application Priority Data

Oct. 21, 2005 (KR) .................... 10-2005-0099871

(51) Int. Cl.
*H02J 7/04* (2006.01)
*H02J 7/16* (2006.01)
*H01M 10/50* (2006.01)
*H01M 6/42* (2006.01)

(52) U.S. Cl. ................ 320/150; 429/120; 429/149; 429/163

(58) Field of Classification Search ........... 320/150, 320/151, 152; 429/72, 73, 98, 99, 149, 120, 429/148, 62, 163
See application file for complete search history.

(56) References Cited

U.S. PATENT DOCUMENTS

| 6,225,788 B1* | 5/2001 | Kouzu et al. ............. 320/150 |
| 6,709,783 B2* | 3/2004 | Ogata et al. ............. 429/120 |
| 6,949,309 B2* | 9/2005 | Moores et al. ............ 429/50 |
| 6,953,638 B2* | 10/2005 | Inui et al. .............. 429/120 |
| 7,147,963 B2* | 12/2006 | Kimoto et al. ............ 429/99 |
| 7,605,562 B2* | 10/2009 | Kim .................... 320/107 |
| 2001/0046624 A1* | 11/2001 | Goto et al. .............. 429/99 |
| 2002/0102454 A1* | 8/2002 | Zhou et al. ............. 429/88 |
| 2004/0135550 A1* | 7/2004 | Nishihata et al. ........ 320/150 |

FOREIGN PATENT DOCUMENTS

| JP | 2004-001683 | 1/2004 |
| JP | 2004-087368 | 3/2004 |
| JP | 2004-152769 | 5/2004 |

* cited by examiner

*Primary Examiner*—Edward Tso
*Assistant Examiner*—Alexis Boateng
(74) *Attorney, Agent, or Firm*—Cantor Colburn LLP

(57) ABSTRACT

In a cooling system for cooling a battery pack mounted in a vehicle, the battery pack is mounted at an inner lower end of the vehicle constructed in a corrugated structure including alternating valleys and peaks. Battery modules of the battery pack are arranged such that unit cells of each battery module are mounted vertically on the corrugated lower end of the vehicle. The cooling system includes a coolant inlet port and a coolant outlet port formed at a lower-end member of a housing surrounding an outer surface of the battery pack. The coolant inlet port and the coolant outlet port are formed using a structure of the vehicle.

11 Claims, 3 Drawing Sheets

COOLING SYSTEM OF BATTERY PACK

FIELD OF THE INVENTION

The present invention relates to a cooling system for cooling a battery pack mounted in a vehicle, and, more particularly, to a cooling system for cooling a battery pack mounted in a vehicle, wherein the battery pack is mounted at the inner lower end of the vehicle constructed in a corrugated structure including alternating valleys and peaks, battery modules constituting the battery pack are arranged such that unit cells constituting each battery module are mounted vertically on the corrugated lower end of the vehicle, and the cooling system comprises a coolant inlet port and a coolant outlet port formed at a lower-end member of a housing surrounding the outer surface of the battery pack in a sealed state. According to the present invention, the coolant inlet port and the coolant outlet port are formed using the structure of the vehicle.

BACKGROUND OF THE INVENTION

One of the biggest problems caused from vehicles using fossil fuel, such as gasoline and diesel oil, is creation of air pollution. A technology of using a secondary battery, which can be charged and discharged, as a power source for vehicles has attracted considerable attention as one method of solving the above-mentioned problem. As a result, electric vehicles (EV), which are operated using only a battery, and hybrid electric vehicles (HEV), which jointly use a battery and a conventional engine, have been developed. Some of the electric vehicles and the hybrid electric vehicles are now being commercially used. A nickel-metal hydride (Ni-MH) secondary battery has been mainly used as the power source for the electric vehicles (EV) and the hybrid electric vehicles (HEV). In recent years, however, the use of a lithium-ion secondary battery has been attempted.

High output and large capacity are needed for such a secondary battery to be used as the power source for the electric vehicles (EV) and the hybrid electric vehicles (HEV). To this end, a plurality of small-sized secondary batteries (unit cells) are connected in series or in parallel with each other so as to constitute a battery module, and a plurality of battery modules are connected in parallel or in series with each other so as to constitute a battery pack.

In such a high-output, large-capacity secondary battery, however, a large amount of heat is generated from the unit cells during the charge and the discharge of the unit cells. When the heat generated from the unit cells during the charge and the discharge of the unit cells is not effectively removed, heat is accumulated in the unit cells with the result that the unit cells are degraded. Consequently, it is necessary to provide a cooling system for cooling a battery pack, which is a high-output, large-capacity secondary battery.

A principle of a cooling system for cooling a battery pack, which is generally used, will be described with reference to FIG. 1.

Referring to FIG. 1, a battery pack cooling system 1 includes a battery pack 2 comprising a plurality of batteries, a coolant inlet part 3 mounted at the lower end surface of the battery pack 2, and a coolant outlet part 4 mounted at the upper end surface of the battery pack 2. The battery pack 2 comprises a plurality of battery modules 5. Each battery module 5 comprises a plurality of unit cells 6, which are electrically connected with each other. Between the unit cells of each battery module 5 are formed small gaps, through which coolant flows. Consequently, coolant introduced through the coolant inlet part 3 flows through the gaps to remove heat generated from the unit cells 6, and is then discharged through the coolant outlet part 4 mounted at the upper end surface of the battery pack 2.

However, the battery pack cooling system 1 constructed as shown in FIG. 1 has the following problems.

First, since the coolant inlet part 3 and the coolant outlet part 4 are mounted at the lower end surface and the upper end surface of the battery pack 2, respectively, it is necessary to provide spaces for installing such coolant guiding members at the lower end surface and the upper end surface of the battery pack 2. As a result, the total size of a battery system is increased, which is not preferable.

Second, it is difficult for the coolant introduced through the coolant inlet part 3 to be uniformly supplied to the respective battery modules 5, and therefore, the temperature difference between the unit cells 6 may greatly increase. Recent research shows that the great temperature difference between the unit cells 6 is one of principal factors greatly decreasing the performance of the battery pack 2.

In order to solve the above-mentioned problems, especially, the volume of the battery system, there have been proposed technologies for providing a coolant inlet port and a coolant outlet port of the cooling system at one side of the battery system to reduce the volume of the battery system, which are disclosed in Japanese Unexamined Patent Publication No. 2004-152769, Japanese Unexamined Patent Publication No. 2004-087368, and Japanese Unexamined Patent Publication No. 2004-001683. However, a technology for providing the coolant inlet port and the coolant outlet port at one side of the battery system using the structure of a vehicle to minimize the volume of the battery system has not been proposed yet.

Also, simple partitions may be mounted in the battery pack to guide the passage of coolant, thereby reducing the temperature difference between the unit cells, as disclosed in Japanese Unexamined Patent Publication No. 2004-152769. However, the partitions cannot effectively reduce the temperature difference between the unit cells, and furthermore, the coolant may not be supplied due to the partitions.

SUMMARY OF THE INVENTION

Therefore, the present invention has been made to solve the above-mentioned problems, and other technical problems that have yet to be resolved.

Specifically, it is an object of the present invention to provide a battery pack cooling system including a coolant inlet port and a coolant outlet port formed using the structure of a vehicle, whereby the battery pack cooling system can be stably mounted to the vehicle, the inner space of the vehicle is efficiently utilized, and the volume of a battery system is minimized.

It is another object of the present invention to provide a battery pack cooling system including partitions mounted in the battery pack for uniformly supplying coolant, whereby heat generated from the battery is effectively removed, and the temperature difference between unit cells is minimized during the cooling process.

In accordance with the present invention, the above and other objects can be accomplished by the provision of a cooling system for cooling a battery pack mounted in a vehicle, wherein the battery pack is mounted at the inner lower end of the vehicle constructed in a corrugated structure including alternating valleys and peaks, battery modules constituting the battery pack are arranged such that unit cells constituting each battery module are mounted vertically on the corrugated lower end of the vehicle, and the cooling system comprises a coolant inlet port and a coolant outlet port formed at a lower-end member of a housing surrounding the outer surface of the battery pack in a sealed state.

In the cooling system according to the present invention, the inner structure of the vehicle is used as a part of the cooling system, i.e., the coolant inlet port and the coolant outlet port. Consequently, the total size of the battery pack is greatly reduced, and the stable attachment of the battery pack to the vehicle is accomplished.

In the present invention, the expression "the inner lower end of the vehicle" means the inner lower end of a vehicle frame constituting a frame of the vehicle. In the geometric aspect, the corrugated structure comprising the valleys and the peaks increases the strength of the vehicle against external forces applied to the vehicle during the driving of the vehicle as compared to a plate-shaped lower end of the vehicle.

As described above, the battery modules are arranged such that the battery modules are mounted vertically on the corrugated lower end of the vehicle. The battery modules are arranged such that the longitudinal direction of the battery modules is perpendicular to the longitudinal direction of the peaks (the valleys), and therefore, the lower-end surfaces of the respective battery modules can be in continuous contact with the adjacent peaks of the corrugated lower end. As a result, predetermined gaps are formed between the lower ends of the battery modules and the inner lower end of the vehicle, at which the battery modules are mounted. The gaps constitute the coolant inlet port and the coolant outlet port.

The battery modules may be directly arranged on the lower end of the vehicle. Preferably, however, the battery modules may be arranged on the lower-end member constructed in a structure corresponding to the lower end of the vehicle. Specifically, the housing of the cooling system is constructed in a structure in which an upper-end member and side members of the housing surround the top parts and the side parts of the battery modules, and the lower-end member of the housing surrounds the lower ends of the battery modules while the lower-end member of the housing has the same gaps as the corrugated structure of the inner lower end of the vehicle. Consequently, the lower-end member of the housing is constructed in a corrugated structure comprising valleys and peaks corresponding to the corrugate lower end of the vehicle. The structure of the lower-end member assists to more stably and securely attach the battery pack to the vehicle.

When the battery modules are mounted on the lower-end member, the lower-end surfaces of the respective battery modules are brought into contact with the peaks of the lower-end member, but the lower-end surfaces of the respective battery modules are not brought into contact with the valleys of the lower-end member. As a result, gaps are formed between the battery modules and the lower-end member. The coolant inlet port and the coolant outlet port are formed by this corrugated structure.

Also, due to the above-described structure, the coolant inlet port and the coolant outlet port are separated from each other by the peak located between the coolant inlet port and the coolant outlet port, and the coolant inlet port and the coolant outlet port are connected with each other via the gaps formed between the battery modules arranged at predetermined intervals along the valleys.

Preferably, the peaks of the lower-end member is constructed in a structure in which the upper ends of the peaks are flat such that the battery modules can be stably mounted on the flat peaks and the coolant inlet port and the coolant outlet port can be reliably separated from each other by the flat peaks.

Preferably, the cooling system further comprises: partitions mounted in the gaps formed between the battery modules for guiding passage of coolant such that the coolant introduced into the cooling system through the coolant inlet port can ascend vertically at least once and then descend toward the coolant outlet port.

Preferably, the partitions are mounted on the lower-end member and/or the upper-end member of the housing at predetermined positions where the introduced coolant can be prevented from directly flowing to the coolant outlet port. Also preferably, the partitions are mounted along the peaks of the lower-end member of the housing in the direction perpendicular to the longitudinal direction of the battery modules. According to circumstances, two or more partitions may be alternately mounted at an upper-end member and the lower-end member of the housing. In this case, the coolant alternately flows through the upper and lower parts of the battery modules by the alternating partitions. Consequently, the cooling efficiency is further increased.

Furthermore, each partition may have a plurality of through-holes having small diameters formed such that, some of the coolant can flow to the unit cells located adjacent to the coolant outlet port immediately after the introduction of the coolant. The through-holes are constructed such that the inner diameters of the through-holes are decreased from the upper part to the lower part of each partition. Consequently, a possible large amount of coolant can flow through the upper part of the battery module.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF MAIN REFERENCE NUMERALS OF THE DRAWINGS

| | |
|---|---|
| 100: cooling system | 200: battery module |
| 111: lower-end member | 120: coolant inlet port |
| 130: coolant outlet port | 140: partitions |

DETAILED DESCRIPTION OF PREFERRED EMBODIMENTS

Now, a preferred embodiment of the present invention will be described in detail with reference to the accompanying drawings. It should be noted, however, that the scope of the present invention is not limited by the illustrated embodiment.

Figure 1:
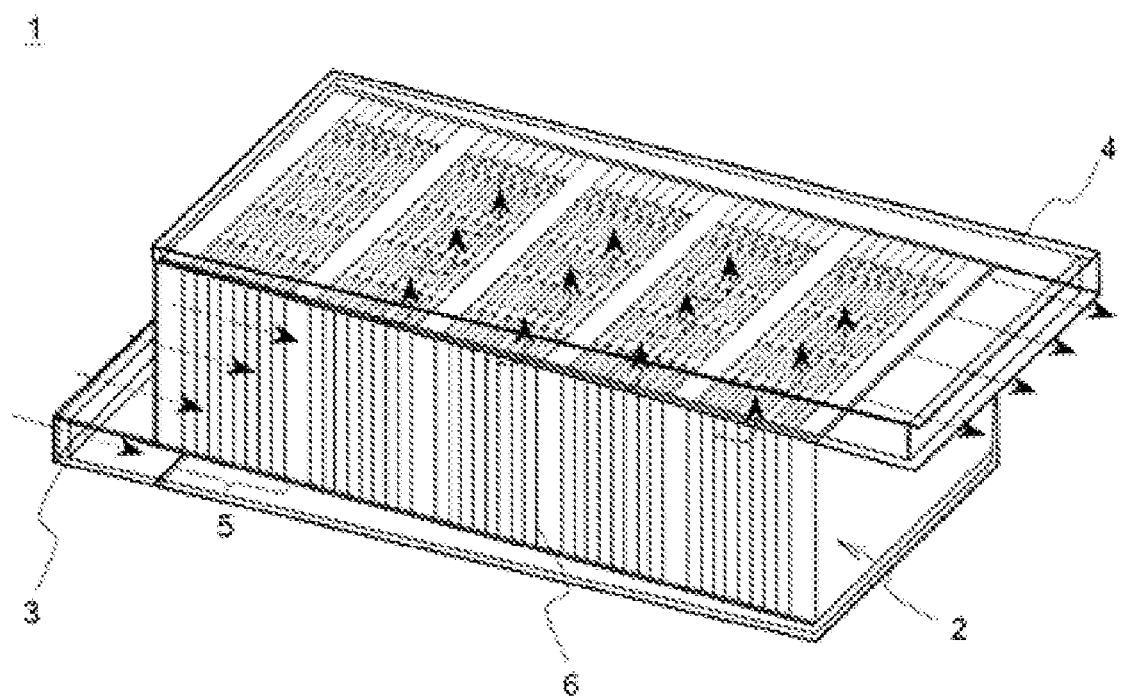
FIG. 1 is a perspective view illustrating a conventional cooling system.
Figure 2:
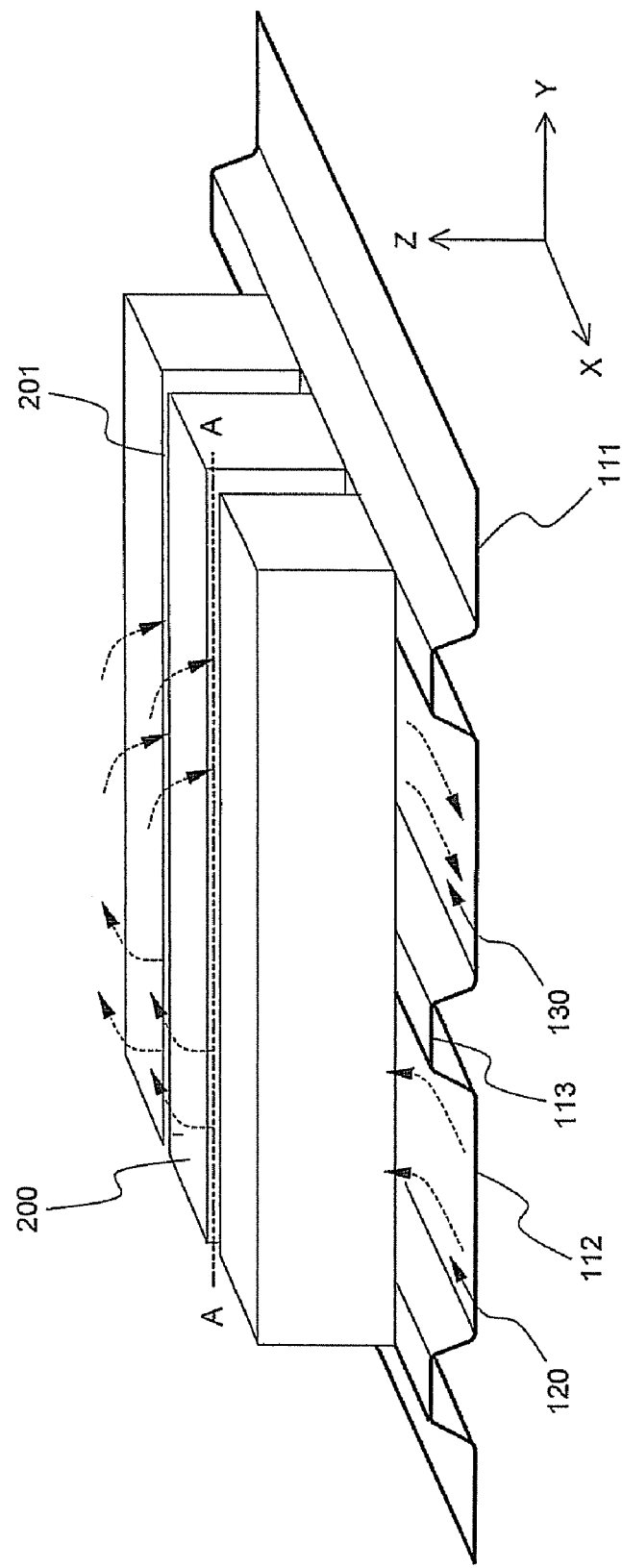
FIG. 2 is a perspective view illustrating a battery pack with a cooling system according to a preferred embodiment of the present invention, wherein the arrangement of battery modules and the passage of coolant are typically shown while a housing of the cooling system is partially removed.

FIG. 2 is a perspective view illustrating a battery pack with a cooling system according to a preferred embodiment of the present invention, wherein the arrangement of battery modules and the passage of coolant are typically shown while a housing of the cooling system is partially removed.

Referring to FIG. 2, the battery modules 200 are arranged on a corrugated lower-end member 111 comprising valleys 112 and peaks 113 such that the longitudinal direction (Y-axis direction) of the battery modules 200 is perpendicular to the longitudinal direction (X-axis direction) of the valleys 112 and/or the peaks 113 of the lower-end member 111. Specifically, the battery modules 200 are arranged at predetermined intervals along the longitudinal direction (X-axis direction) of the peaks 113 while the battery modules 200 are in contact with only the peaks 113 due to the structural characteristics of the lower-end member 111.

As the battery modules 200 are spaced apart from the valleys 112 while the battery modules 200 are in contact with the peaks 113 of the lower-end member 111 of the housing, a coolant inlet port 120 and a coolant outlet port 130 are formed in the cooling system. Also, as the battery modules 200 are spaced a predetermined distance from each other along the peaks 113, gaps 201 are formed between the battery modules 200.

The coolant inlet port 120 and the coolant outlet port 130 are separated from each other by the peak 113 located between the coolant inlet port 120 and the coolant outlet port 130. Also, the coolant inlet port 120 and the coolant outlet port 130 are arranged in parallel with each other, and the coolant inlet port 120 and the coolant outlet port 130 are connected with each other via the gaps 201 formed between the battery modules 200.

In the drawing, flow of the coolant is shown by dotted-line arrows. The coolant introduced through the coolant inlet port 120 ascends vertically through the gaps 201 at the coolant inlet port 120 side, flows toward the coolant outlet port 130 side along an upper-end member (not shown) of the housing, descends vertically through the gaps 201 at the coolant outlet port 130 side, and is discharged through the coolant outlet port 130. At this time, the passage of the coolant is defined by the housing 110 of the cooling system and partitions (not shown) mounted in the cooling system.

Figure 3:
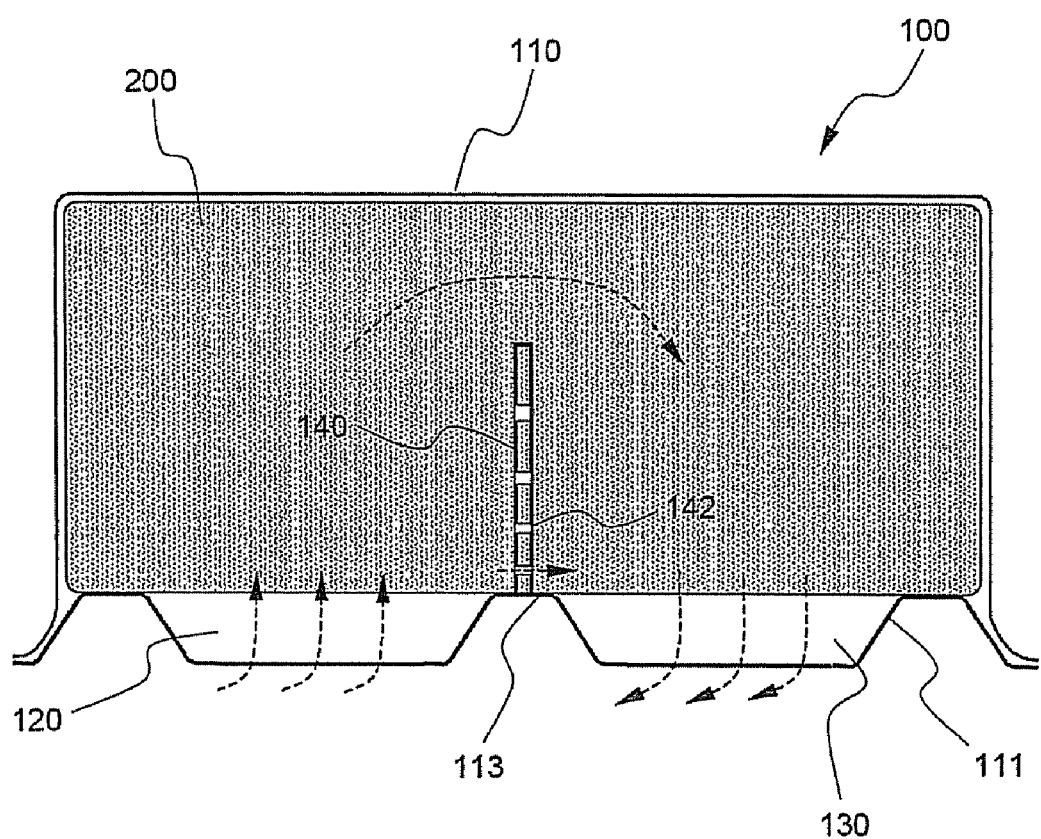
FIG. 3 is a vertical section view taken along line A-A of FIG. 2.

FIG. 3 is a vertical section view taken along line A-A of FIG. 2.

Referring to FIG. 3, a battery pack 100 according to the present invention includes battery modules 200 and a cooling system 100 comprising a housing surrounding the outer surfaces of the battery modules 200, and a coolant inlet port 120 and a coolant outlet port 130 formed at a lower-end member 111 of the housing 110.

The cooling system 100 further comprises partitions 140 for guiding coolant to flow through the gaps 201 (see FIG. 2) formed between the battery modules 200, and therefore, preventing coolant introduced through the coolant inlet port 120 from directly flowing to the coolant outlet port 130 side.

The partitions 140 serve to prevent the coolant from directly flowing from the coolant inlet port 120 to the coolant outlet port 130. To this end, the partitions 140 are mounted on the peaks 113 of the lower-end member 111 in succession, and the partitions 140 are arranged in the direction perpendicular to the longitudinal direction of the battery modules 200.

Each partition 140 is provided with a plurality of through-holes 142 having small inner diameters, through which some of the coolant flows directly from the coolant inlet port 120 to the coolant outlet port 130 so as to cool the battery modules located adjacent to the coolant outlet port 130 and thus not cooled effectively by the increased-temperature coolant having passed by the battery modules 200. The through-holes 142 are constructed such that the inner diameters of the through-holes are decreased from the upper part to the lower part of each partition 140, and therefore, a possible large amount of coolant can flow through the upper part of the battery module 200.

Although the preferred embodiment of the present invention has been disclosed for illustrative purposes, those skilled in the art will appreciate that various modifications, additions and substitutions are possible, without departing from the scope and spirit of the invention as disclosed in the accompanying claims.

INDUSTRIAL APPLICABILITY

As apparent from the above description, the cooling system according to the present invention includes a coolant inlet port and a coolant outlet port formed using the structure of a vehicle. Consequently, the cooling system can be stably mounted to the vehicle, the inner space of the vehicle is efficiently utilized, and the volume of the battery system is minimized.

Furthermore, the cooling system according to the present invention includes partitions mounted in the battery pack for uniformly supplying coolant. Consequently, heat generated from the battery is effectively removed, and the temperature difference between unit cells is minimized during the cooling process.

What is claimed is:

1. A cooling system for cooling a battery pack mounted in a vehicle, the cooling system comprising:
   a coolant inlet port; and
   a coolant outlet port formed together with the coolant inlet port at a lower-end member of a housing surrounding an outer surface of the battery pack in a sealed state, wherein
   the battery pack is mounted at an inner lower end of the vehicle constructed in a corrugated structure including a plurality of alternating valleys and peaks,
   battery modules of the battery pack are arranged such that unit cells of each of the battery modules are mounted vertically on the inner lower end of the vehicle,
   the lower-end member of the housing is constructed as a structure corresponding to the inner lower end of the vehicle, and
   the coolant inlet port and the coolant outlet port are formed by the lower-end member of the housing having the corrugated structure.

2. The cooling system according to claim 1, further comprising:
   partitions mounted between the battery modules for guiding passage of coolant such that the coolant introduced into the cooling system through the coolant inlet port can ascend vertically at least once and then descend toward the coolant outlet port.

3. The cooling system according to claim 2, wherein the partitions are mounted on the lower-end member of the housing at predetermined positions where a large majority of coolant can be prevented from directly flowing from the coolant inlet port to the coolant outlet port.

4. The cooling system according to claim 2, wherein two or more partitions are alternately mounted at an upper-end member and the lower-end member of the housing.

5. The cooling system according to claim 2, wherein the partitions are arranged between the coolant inlet port and the coolant outlet port in a direction perpendicular to the battery modules.

6. The cooling system according to claim 3, wherein each partition has a plurality of through-holes having small diameters.

7. The cooling system according to claim 6, wherein the through-holes are constructed such that inner diameters of the through-holes are decreased from an upper part to a lower part of each partition.

8. The cooling system according to claim 4, wherein each partition has a plurality of through-holes having small diameters.

9. The cooling system according to claim 5, wherein each partition has a plurality of through-holes having small diameters.

10. The cooling system according to claim 8, wherein the through-holes are constructed such that inner diameters of the through-holes are decreased from an upper part to a lower part of each partition.

11. The cooling system according to claim 9, wherein the through-holes are constructed such that inner diameters of the through-holes are decreased from an upper part to a lower part of each partition.

* * * * *